(12) United States Patent
Jeong et al.

(10) Patent No.: US 7,710,826 B2
(45) Date of Patent: May 4, 2010

(54) METHOD AND APPARATUS FOR MEASURING SOUND SOURCE DISTANCE USING MICROPHONE ARRAY

(75) Inventors: Jae-hoon Jeong, Yongin-si (KR);
Kwang-cheol Oh, Yongin-si (KR);
Kyu-hong Kim, Yongin-si (KR);
So-young Jeong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/081,782

(22) Filed: Apr. 21, 2008

(65) Prior Publication Data
US 2009/0097360 A1    Apr. 16, 2009

(30) Foreign Application Priority Data
Oct. 16, 2007    (KR) ...................... 10-2007-0104061

(51) Int. Cl.
*G01S 3/80*    (2006.01)

(52) U.S. Cl. ..................................................... 367/124
(58) Field of Classification Search ................. 367/124, 367/127
See application file for complete search history.

(56) References Cited

U.S. PATENT DOCUMENTS

2006/0080089 A1* 4/2006 Vierthaler et al. ........... 704/208
2009/0097360 A1* 4/2009 Jeong et al. .................. 367/127

* cited by examiner

*Primary Examiner*—Dan Pihulic
(74) *Attorney, Agent, or Firm*—Staas & Halsey LLP (57) ABSTRACT

A method and apparatus for measuring a distance to a sound source. The method includes combining sound source signals input through at least two microphones and generating at least two microphone output signals, and performing an operation on the generated microphone output signals and calculating a distance to a sound source by using the relationship between a result of the operation and a frequency of the input sound source signals. Accordingly, regardless of the strength of a sound source, the distance to a sound source can be measured.

12 Claims, 6 Drawing Sheets

FIG. 6B $$F_1 = \begin{bmatrix} 1 & 0 & 0 & 0 \\ 0 & -1 & 0 & 0 \\ 0 & 0 & -1 & 0 \\ 0 & 0 & 0 & 1 \end{bmatrix}$$

FIG. 7B $$F_2 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

METHOD AND APPARATUS FOR MEASURING SOUND SOURCE DISTANCE USING MICROPHONE ARRAY

CROSS-REFERENCE TO RELATED APPLICATIONS

This application claims the benefit of Korean Patent Application No. 10-2007-0104061, filed on Oct. 16, 2007, in the Korean Intellectual Property Office, the disclosure of which is incorporated herein in its entirety by reference.

BACKGROUND

1. Field

One or more embodiments of the present invention relate to an acoustic system, and more particularly, to a method and apparatus for measuring a distance to a sound source by using a microphone array.

2. Description of the Related Art

There are various application fields for technology which measures a distance to a sound source by only using an input to a microphone. When a distance to a speaker is known, a volume of a speaker can be regulated according to the distance so that the speaker can be heard well. In addition, during recording, an input-gain of a microphone can be appropriately regulated according to the distance to a speaker. In regulating an input-gain of a microphone based on a volume level, a speaker's voice cannot be heard if there is a large amount of ambient noise. However, if the distance to the speaker is known, an input-gain of a microphone can be regulated according to the distance.

In addition, a map indicating a location of a sound source can be drawn. Here, when a direction of and a distance to a sound source are known, which sound source is located in which location can be measured. In other words, the location generating noise can be determined. In addition, if information on the distance to a sound source is known, such information can be used to classify a sound source according to the distance. Moreover, various signal processing technologies using a distance can be applied to devices with microphones.

When a number of sound sources are mixed, technologies for removing only a sound source that is not desired, picking out only a desired sound source, and grouping according to the sound sources, use various sound source characteristics.

When noise can be easily detected, noise is removed using noise subtraction from sound in which noise and desired sound sources are mixed so that the desired signals remain. Also, when statistical characteristics of the sound sources are different to each other, a sound sources classifying method using the statistical differences of the sound sources, is used.

In addition, in the case of using geometrical characteristics of the sound sources, when the directions between the sound sources are different, only a sound source which can be heard from where the desired sound exists can be detected using a beam-forming technology. In addition to the directions, the distance between a sound source and a microphone is also important as geometrical characteristics of the sound sources.

As a method of obtaining the distance between the sound source and the microphone, a technology for calculating the distance between the sound source and the microphone, by using a level difference between a reference microphone and other microphone and an arrival time difference is disclosed. However, in such a method, an attenuation rate according to a distance to a general microphone is used and thus sensitivity according to the distance decreases. Moreover, if the distance of the sound source is to be used in signal processing at a back end, the distance should be measured based on frequency so that more detailed information can be provided. However, the distance based on the frequency cannot be measured using the method described above.

SUMMARY

One or more embodiments of the present invention provide a method and apparatus for measuring a distance to a sound source, regardless of the strength of the sound source, by using microphone outputs having high sensitivity and each having a different attenuation rate according to the distance by forming a microphone system having a high attenuation rate according to the distance from a microphone to the sound source.

Additional aspects and/or advantages will be set forth in part in the description which follows and, in part, will be apparent from the description, or may be learned by practice of the invention.

According to an aspect of the present invention, there is provided a method of measuring a distance to a sound source, including combining sound source signals input through at least two microphones and generating at least two microphone output signals, and performing an operation on the generated microphone output signals and calculating a distance to a sound source by using the relationship between a result of the operation and the distance according to a frequency of the input sound source signals.

According to another aspect of the present invention, there is provided an apparatus for measuring a distance to a sound source, including at least two microphone output generating units which combine sound source signals input through at least two microphones and generating at least two microphone output signals, and a distance measuring unit which performs an operation on the microphone output signals generated by the microphone output generating units and calculates a distance to a sound source using a relationship between the a result of the operation and the distance according to a frequency of the input sound source signals.

According to another aspect of the present invention, there is provided a computer readable recording medium having embodied thereon a computer program for executing the method above.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Reference will now be made in detail to the embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, exemplary embodiments are merely described below, by referring to the figures, to explain aspects of the present invention.

Figure 1:
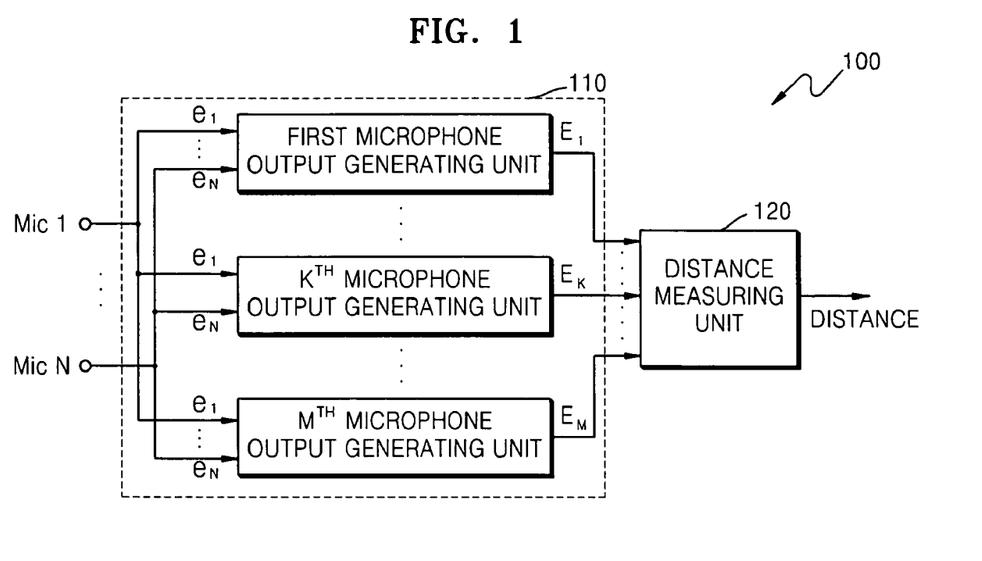
FIG. 1 is a block diagram schematically illustrating an apparatus for measuring a distance to a sound source, according to an embodiment of the present invention.

FIG. 1 is a block diagram schematically illustrating an apparatus for measuring a distance to a sound source 100, according to an embodiment of the present invention. Herein, in the present application, the term apparatus should be considered synonymous with the term system, and not limited to a single enclosure or all described elements embodied in single respective enclosures in all embodiments, but rather, depending on embodiment, is open to being embodied together or separately in differing enclosures and/or locations through differing elements, e.g., a respective apparatus/system could be a single processing element or implemented through a distributed network, noting that additional and alternative embodiments are equally available.

Referring to FIG. 1, the apparatus for measuring a distance to a sound source 100 includes a microphone output generating unit 110 and a distance measuring unit 120.

The microphone output generating unit 110 combines sound source signals e1, ... $e_N$, respectively input through at least two microphones Mic 1, ... Mic N and generates at least two microphone output signals $E_1, \ldots E_k, \ldots E_M$.

The distance measuring unit 120 performs an operation on the microphone output signals $E_1, \ldots E_k, \ldots E_M$ which are generated from the microphone output generating unit 110. Also, the distance measuring unit 120 calculates a distance to a sound source by using the relationship between the operation result and the distance according to a frequency of the input sound source signals. The distance measuring unit 120 will be described in more detail with reference to FIG. 8.

The microphone output generating unit 110 manufactures outputs of a microphone system and uses at least two microphones Mic 1, ... Mic N. Here, characteristics of the microphones can be the same or different from each other. Inputs to these microphones are combined and outputs $E_1$-$E_M$ are generated through a first microphone output generating unit, a $K^{th}$ microphone output generating unit, and an $M^{th}$ microphone output generating unit. Here, such a combination of inputs to the microphones can be any function including a linear function and a non-linear function. In addition, an attenuation rate according to a distance should be different from each other in outputs from each of the microphone output generating units. Accordingly, regardless of the strength of a sound source, a distance to a sound source can be measured by using the microphone outputs each having a different attenuation rate according to a distance.

Figure 2:
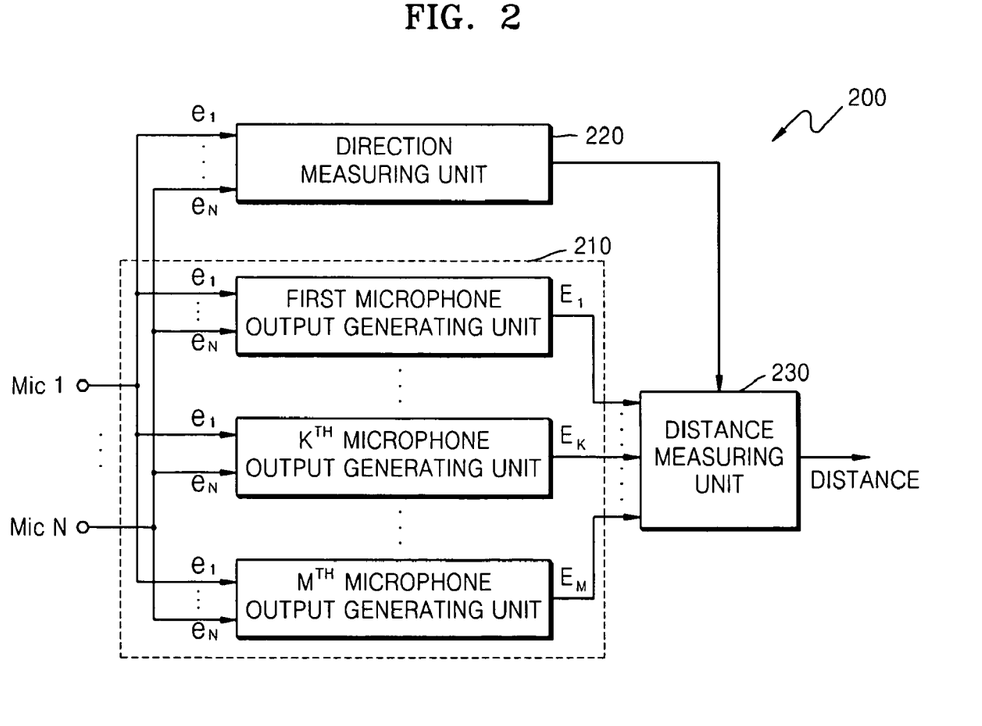
FIG. 2 is a block diagram schematically illustrating an apparatus for measuring a distance to a sound source, according to another embodiment of the present invention.

FIG. 2 is a block diagram schematically illustrating an apparatus for measuring a distance to a sound source 200, according to another embodiment of the present invention.

Referring to FIG. 2, the apparatus for measuring a distance to a sound source 200 includes a direction measuring unit 220, a microphone output generating unit 210 and a distance measuring unit 230. The direction measuring unit 220 receives sound source signals e1, ... $e_N$, from the microphones Mic 1, ... Mic N and calculates input directions E of the sound source signals.

Calculating the input directions θ of the sound source signals will be described with reference to FIG. 3.

Figure 3:
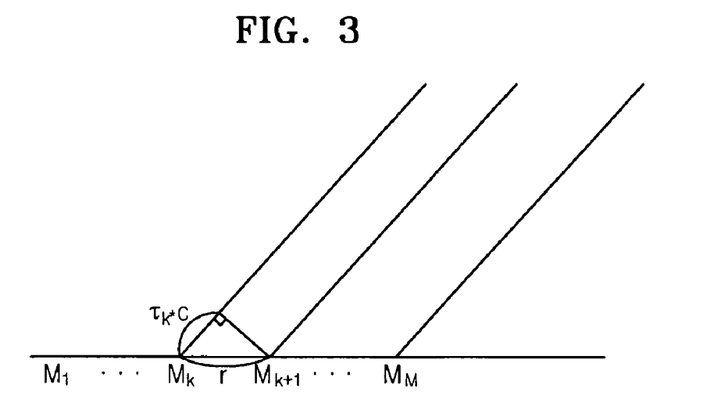
FIG. 3 is a diagram for describing the direction measuring unit illustrated in FIG. 2.

FIG. 3 is a diagram for describing a direction measuring unit 220 illustrated in FIG. 2. Referring to FIG. 3, the directions of the sound sources are obtained by using time delays between the sound source signals input to the microphones Mic 1, ... Mic N. That is, a delay-and-sum method is used, which obtains a direction of a sound source by using the time delays between signals and the time delays can be calculated by using a correlation between inputs to the microphones. Also, when a distance to a sound source is very short, compared with an aperture size of the microphone, the sound source can be assumed to be a plane wave. Accordingly, an angle can be obtained using Equations 1 and 2.

$$\tau_k \cdot c = r \cdot \cos\theta \qquad \text{Equation 1}$$

$$\theta = \cos^{-1}\left(\frac{\tau_k \cdot c}{r}\right) \qquad \text{Equation 2}$$

Here, $t_k$ denotes a delay between a $K^{th}$ microphone and a $K+1^{th}$ microphone and c denotes the speed of a sound wave in air.

Figure 4A:
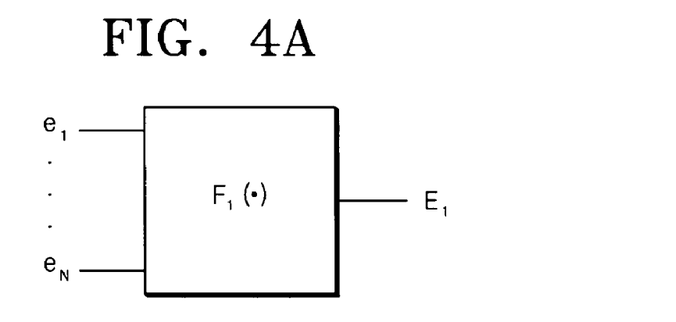
FIGS. 4A through 4C are diagrams for describing the microphone output generating unit and a distance measuring unit illustrated in FIG. 1.
Figure 4B:
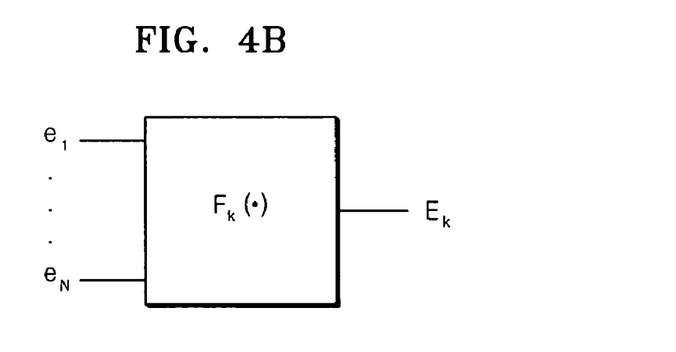
Figure 4C:
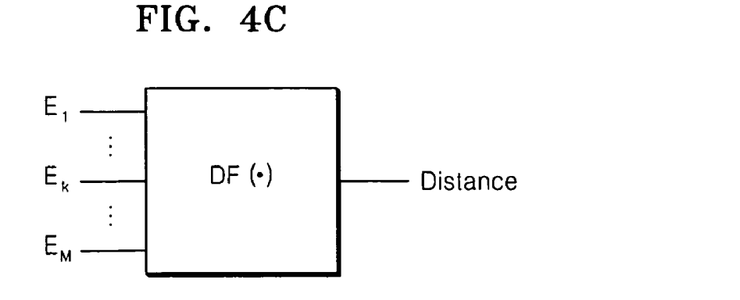

FIGS. 4A through 4C are diagrams for describing the microphone output generating unit 110 and the distance measuring unit 120 illustrated in FIG. 1.

FIG. 4A illustrates an example of the first microphone output generating unit and FIG. 4B illustrates an example of the $K^{th}$ microphone output generating unit. Here, functions $F_1(\bullet)$ and $F_K(\bullet)$ operate upon attenuation rates of each different sound. FIG. 4C illustrates an example of the distance measuring unit 120. Here, DF(•) can be any function including a linear function and a non-linear function.

Figure 5:
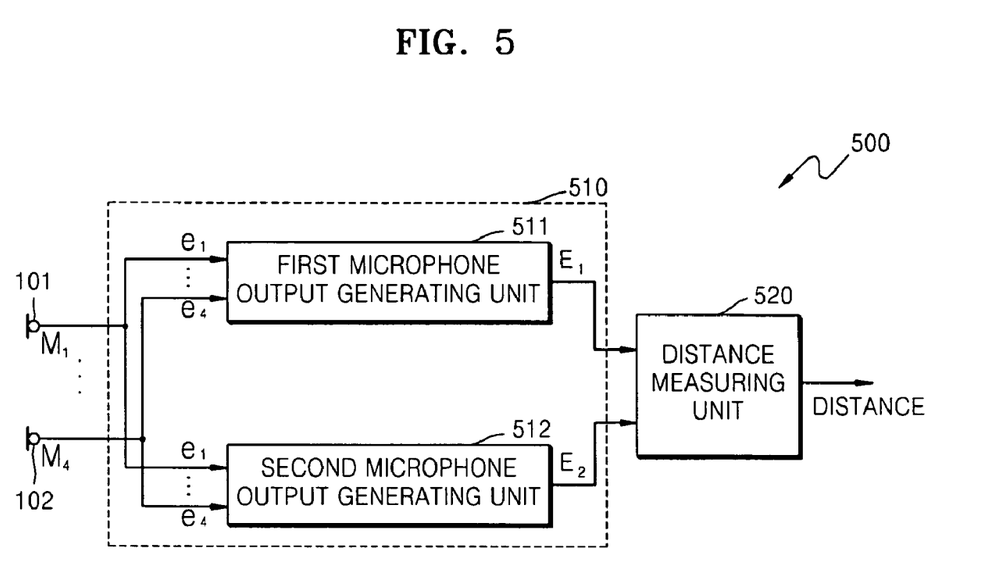
FIG. 5 is a detailed block diagram of an apparatus for measuring a distance to a sound source, according to another embodiment of the present invention.

FIG. 5 is a detailed block diagram of the apparatus for measuring a distance to a sound source 500, according to another embodiment of the present invention.

Referring to FIG. 5, microphones $M_1, \ldots M_4$, 101 and 102 respectively, a microphone output generating unit 510 including a first microphone output generating unit 511 and a second microphone output generating unit 512, and a distance measuring unit 520 are illustrated.

Sound source signals e1, ... e4 input from the microphones $M_1, \ldots M_4$, 101 and 102 respectively, are input to the first microphone output generating unit 511 and the second microphone output generating unit 512. The first microphone output generating unit 511 is a $2^{nd}$ order gradient microphone system and the second microphone output generating unit 512 is an omni microphone system. In FIG. 5, the microphones are 4 omni microphones and use 2 microphone systems. However, the microphones can use two or more microphone systems. In addition, the direction measuring unit 220 of FIG. 2 can be further included.

Figure 6A:
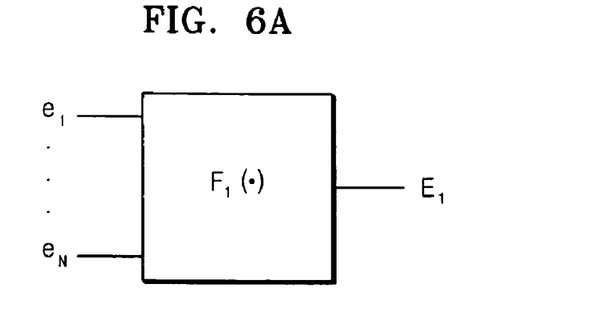
FIGS. 6A through 6C are diagrams for describing the first microphone output generating unit illustrated in FIG. 5.
Figure 6B:
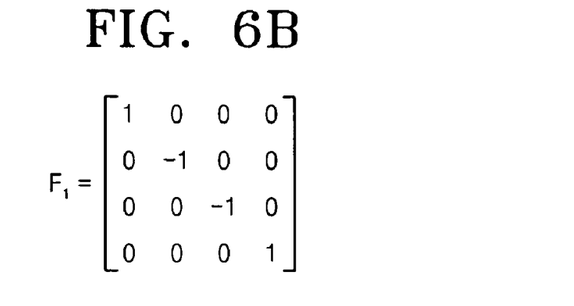
Figure 6C:
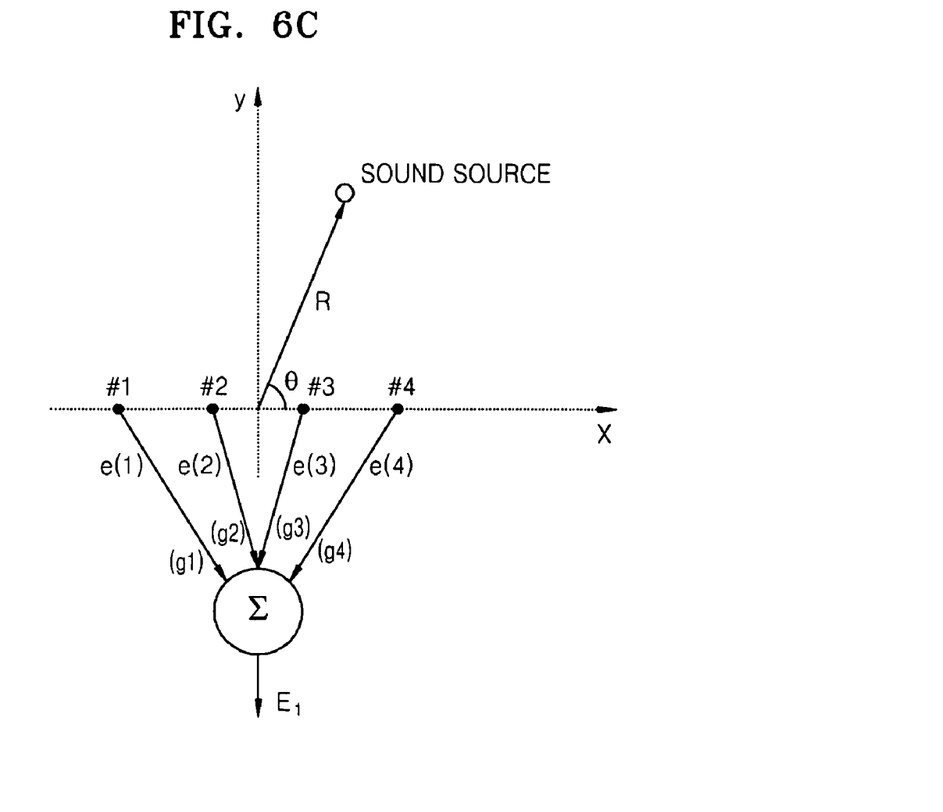

The relationship between the input and output of the $2^{nd}$ order gradient microphone system is illustrated in FIGS. 6A through 6C.

As illustrated in FIGS. 6A and 6B, function $F_1(\bullet)$ can be a linear transformation in which elements of the g matrix, [g11, g22, g33, g44]=[1, −1, −1, 1] and the rest of the g matrix is 0. As illustrated in FIG. 6C, if the input sound source has the angle θ between a line R from the center of the microphones to the sound source and an x-axis, a microphone output is as given by Equation 3.

$$e = A \frac{\sin\frac{2\pi}{\lambda}(c \cdot t - r)}{r}$$

$$r(j) = \sqrt{(x(j) - R \cdot \cos\theta)^2 + (y(j) - R \cdot \sin\theta)^2},$$

where, $j = 1, 2, 3, 4$.

$$e(t, \lambda, j) = A \frac{\sin\left[\omega \cdot t - \frac{2\pi}{\lambda} \cdot r(j)\right]}{R(J)}, \text{ where, } \omega = \frac{2\pi}{\lambda} \cdot c$$

$$E_g(t, \lambda) = A \cdot \sum_{j=1}^{4} g(j) \left[\frac{\sin\left[\omega \cdot t - \frac{2\pi}{\lambda} \cdot r(j)\right]}{r(j)}\right] =$$

$$A \cdot \sum_{j=1}^{4} g(j) \frac{\cos\left[\frac{2\pi}{\lambda} \cdot r(j)\right]}{r(j)} \sin\omega \cdot t -$$

$$A \cdot \sum_{j=1}^{4} g(j) \frac{\sin\left[\frac{2\pi}{\lambda} \cdot r(j)\right]}{r(j)} \cos\omega \cdot t$$

$$|E_1(t, \lambda)| = A \cdot \sqrt{\left(\sum_{j=1}^{4} g(j) \frac{\cos\psi}{r(j)}\right)^2 + \left(\sum_{j=1}^{4} g(j) \frac{\sin\psi}{r(j)}\right)^2},$$

where, $\psi = \frac{2\pi}{\lambda} \cdot r(j)$.

Equation 3

Figure 7A:
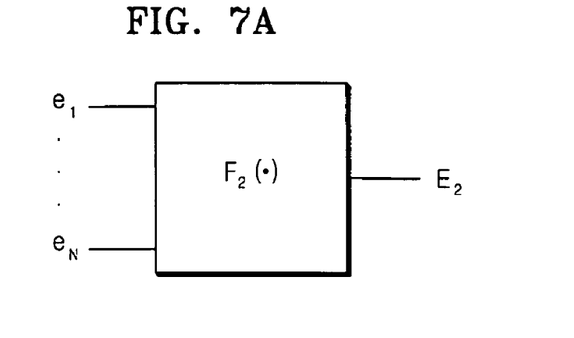
FIGS. 7A through 7C are diagrams for describing the second microphone output generating unit illustrated in FIG. 5.
Figure 7B:
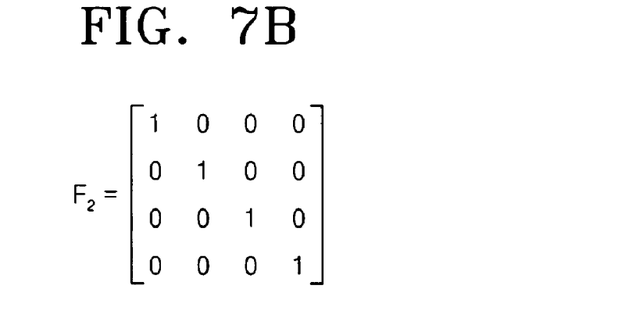
Figure 7C:
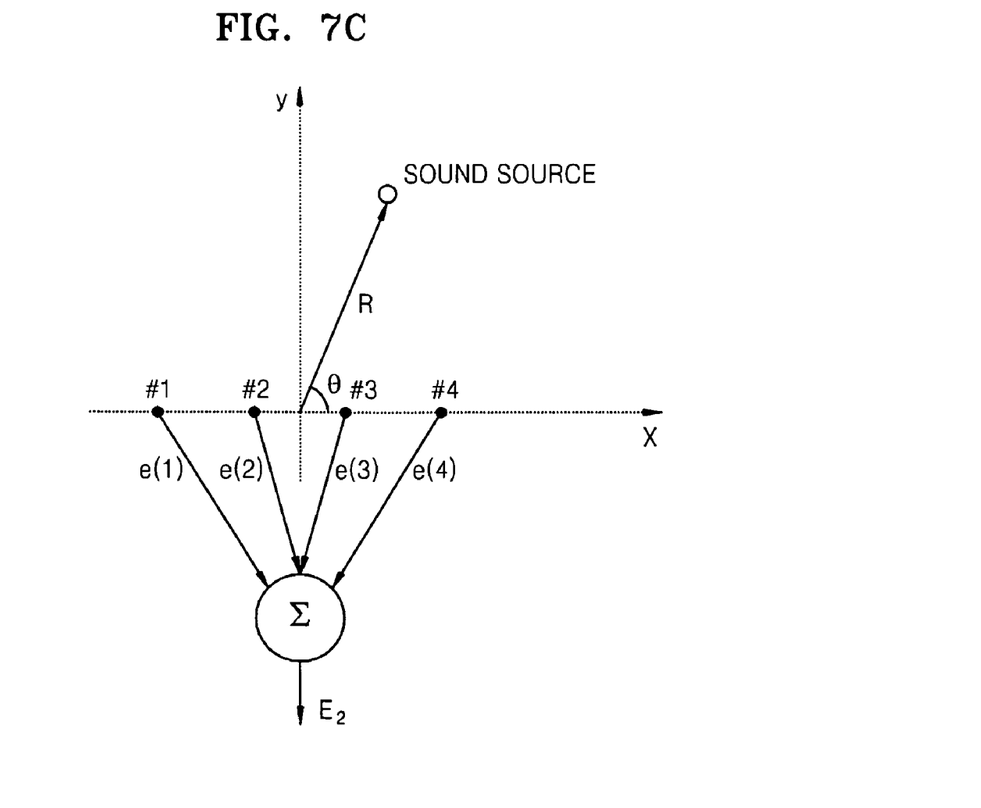

The relationship between the input and output of the omni microphone system is illustrated in FIGS. 7A through 7C. For the sum of the omni microphone, as illustrated in FIGS. 5A and 5B, function F2(•) can be a linear transformation in which elements of matrix g, [g11, g22, g33, g44]=[1, 1, 1, 1] and the rest of the matrix g is 0. As illustrated in FIG. 5C, if the input sound source has the angle θ between a line R from the center of the microphone to the sound source and an x-axis, a microphone output is as given by Equation 4.

$$e = A \frac{\sin\frac{2\pi}{\lambda}(c \cdot t - r)}{r}$$

$$r(j) = \sqrt{(x(j) - R \cdot \cos\theta)^2 + (y(j) - R \cdot \sin\theta)^2},$$

where, $j = 1, 2, 3, 4$.

$$e(t, \lambda, j) = A \frac{\sin\left[\omega \cdot t - \frac{2\pi}{\lambda} \cdot r(j)\right]}{r(j)}, \text{ where, } \omega = \frac{2\pi}{\lambda} \cdot c$$

$$E_o(t, \lambda) = A \cdot \sum_{j=1}^{4} \left[\frac{\sin\left[\omega \cdot t - \frac{2\pi}{\lambda} \cdot r(j)\right]}{r(j)}\right] =$$

$$A \cdot \sum_{j=1}^{4} \frac{\cos\left[\frac{2\pi}{\lambda} \cdot r(j)\right]}{r(j)} \sin\omega \cdot t -$$

Equation 4

-continued $$A \cdot \sum_{j=1}^{4} \frac{\sin\left[\frac{2\pi}{\lambda} \cdot r(j)\right]}{r(j)} \cos\omega \cdot t$$

$$|E_2(t, \lambda)| = A \cdot \sqrt{\left(\sum_{j=1}^{4} \frac{\cos\psi}{r(j)}\right)^2 + \left(\sum_{j=1}^{4} \frac{\sin\psi}{r(j)}\right)^2},$$

where, $\psi = \frac{2\pi}{\lambda} \cdot r(j)$.

Referring back to FIG. 5, the distance measuring unit 520 receives the output $E_1$ of the first microphone output generating unit 511 and the output $E_2$ of the second microphone output generating unit 512 and an operation is performed to obtain the ratio of E1 and E2 as given by Equation 5.

$$E_1 = A \sqrt{\left(\sum_{j=1}^{4} g(j) \frac{\cos\psi}{r(j)}\right)^2 + \left(\sum_{j=1}^{4} g(j) \frac{\sin\psi}{r(j)}\right)^2}$$

Equation 5

$$E_2 = A \sqrt{\left(\sum_{j=1}^{4} \frac{\cos\psi}{r(j)}\right)^2 + \left(\sum_{j=1}^{4} \frac{\sin\psi}{r(j)}\right)^2}$$

$$\frac{E_1}{E_2} = \frac{A\sqrt{\left(\sum_{j=1}^{4} g(j) \frac{\cos\psi}{r(j)}\right)^2 + \left(\sum_{j=1}^{4} g(j) \frac{\sin\psi}{r(j)}\right)^2}}{A\sqrt{\left(\sum_{j=1}^{4} \frac{\cos\psi}{r(j)}\right)^2 + \left(\sum_{j=1}^{4} \frac{\sin\psi}{r(j)}\right)^2}} =$$

$$\frac{\sqrt{\left(\sum_{j=1}^{4} g(j) \frac{\cos\psi}{r(j)}\right)^2 + \left(\sum_{j=1}^{4} g(j) \frac{\sin\psi}{r(j)}\right)^2}}{\sqrt{\left(\sum_{j=1}^{4} \frac{\cos\psi}{r(j)}\right)^2 + \left(\sum_{j=1}^{4} \frac{\sin\psi}{r(j)}\right)^2}}$$

where, $\psi = \frac{2\pi \cdot r(j)}{\lambda} =$ $$\frac{2\pi \cdot f \cdot r(j)}{c} = \frac{2\pi \cdot f \cdot \sqrt{(x(j) - R \cdot \cos\theta)^2 + (y(j) - R \cdot \cos\theta)^2}}{c}$$

Here, A, which corresponds to the amplitude of the sound source, cancels out by division. Accordingly, regardless of the amplitude of the sound source, a distance to the sound source can be obtained. Thus, $E_1/E_2$ can be a function of the frequency f and the distance R. That is, if the value of $E_1/E_2$ and the frequency f are known, the distance R can be obtained.

Referring back to FIG. 2, when additionally a direction of the input sound source signal is considered, if the value of $E_1/E_2$ with respect to the input direction θ calculated by the direction measuring unit 220 and the frequency f are known, the distance R can be obtained.

Figure 8:
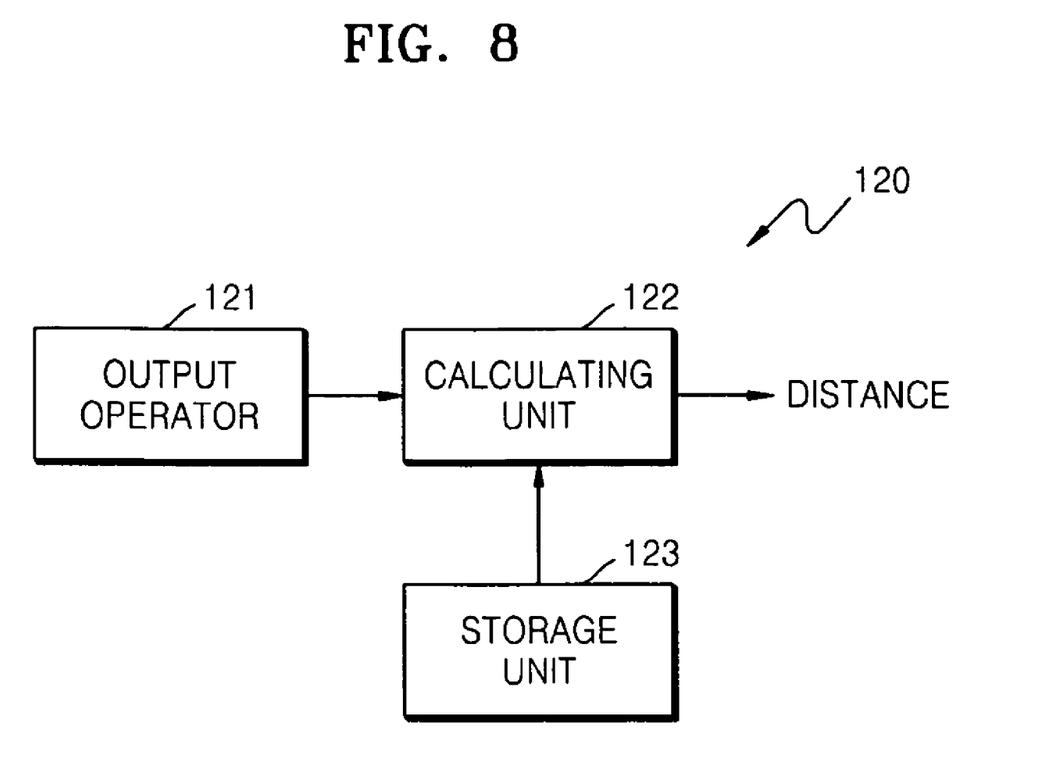
FIG. 8 is a detailed block diagram of the distance measuring unit illustrated in FIG. 1.

FIG. 8 is a detailed block diagram of the distance measuring unit 120 illustrated in FIG. 1.

Referring to FIG. 8, the distance measuring unit 120 includes an output operator 121, a calculating unit 122, and a storage unit 123.

The output operator 121 performs an operation upon the microphone output signals $E_1, \ldots E_M$ generated from the microphone output generating unit. For example, as illustrated in FIG. 5, an operation is performed using the ratio of $E_1$ and $E_2$ with respect to the output $E_1$ of the first microphone output generating unit 511 and the output E2 of the second microphone output generating unit 512.

The calculating unit 122 calculates the distance to a sound source by using the relationship between the operation result of the microphone output signals and the distance according to the frequency of the sound source signals. Here, the relationship between the frequency of the input sound source signal and the distance according to the frequency is stored in the storage unit 123. Accordingly, if the relationship between the output signals of each different microphone output system, for example, the value of $E_1/E_2$ in FIG. 5, is known, the distance to a sound source having a specific frequency can be calculated by performing an operation. In particular, regardless of the magnitude of sound from a sound source, when a sound source varies with time, the distance can be calculated.

In addition to the above described embodiments, embodiments of the present invention can also be implemented on a computer through computer readable code/instructions in/on a medium, e.g., a computer readable medium, to control at least one processing element to implement any above described embodiment. The medium can correspond to any medium/media permitting the storing of the computer readable code.

The units discussed herein can be implemented on a computer and the results displayed on a computer display.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs).

The instructions/code can also be transferred over a transmission medium such as media carrying or including carrier waves, as well as elements of the Internet, for example. Thus, the transmission medium may be such a defined and measurable structure including or carrying a signal or information, such as a device carrying a bitstream, for example, according to embodiments of the present invention. The transmission media may also be a distributed network, so that the computer readable code is transferred and executed in a distributed fashion. Still further, as only an example, the computer implementing embodiments of the present invention may include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of measuring a distance to a sound source, the method comprising:

combining sound source signals input through at least two microphones and generating at least two microphone output signals;

performing an operation upon the generated microphone output signals; and calculating a distance to the sound source by using a relationship between the result of the operation and a frequency of the input sound source signals.

2. The method of claim 1, further comprising calculating input directions of the sound source signals by using time delays between input sound source signals, and wherein the distance to the sound source is calculated by using the calculated input directions of the sound source signals.

3. The method of claim 1, wherein the microphone output signals have attenuation rates that are different from each other based on a distance to the sound source.

4. The method of claim 1, wherein the combining of the input sound source signals comprises a linear or non-linear function.

5. The method of claim 1, wherein the calculating of a distance to a sound source is performed regardless of a strength of the input sound source signals.

6. A recording medium having embodied thereon a computer program to control a computer for executing the method of claim 1.

7. An apparatus for measuring a distance to a sound source, the apparatus comprising:

at least two microphone output generating units which combine sound source signals input through at least two microphones and generate at least two microphone output signals; and a distance measuring unit which performs an operation upon the microphone output signals generated by the microphone output generating units and calculates a distance to the sound source using a relationship between the result of the operation and a frequency of the input sound source signals.

8. The apparatus of claim 7, further comprising a direction measuring unit which calculates input directions of the sound source signals by using time delays between input sound source signals and wherein the distance measuring unit calculates a distance to the sound source by using the calculated directions of the input sound source signals.

9. The apparatus of claim 7, wherein the microphone output generating unit generates the microphone output signals having attenuation rates that are different from each other based on a distance to the sound source.

10. The apparatus of claim 7, wherein the distance measuring unit further comprises:

an output operator which performs an operation on the microphone output signals generated from the microphone output generating unit;

a storage unit which stores the relationship between the frequency of the input sound source signal and the distance to the sound source according to the frequency; and a calculating unit which calculates the distance to a sound source by using a relationship between the operation result of the microphone output signals and a frequency of the sound source signals.

11. The apparatus of claim 7, wherein the microphone output generating unit combines the input sound source signals linearly or non-linearly.

12. The method of claim 1, wherein each of the at least two microphone output signals is a linear transformation of the sound source signals by corresponding linear transformation matrices.

* * * * *